(12) United States Patent
Wellman et al.

(10) Patent No.: US 9,223,007 B2
(45) Date of Patent: Dec. 29, 2015

(54) KALMAN FILTERING WITH INDIRECT NOISE MEASUREMENTS

(71) Applicant: Raytheon Company, Waltham, MA (US)

(72) Inventors: William H. Wellman, Santa Barbara, CA (US); Eric J. Gudim, Goleta, CA (US); Lee M. Savage, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 285 days.

(21) Appl. No.: 13/682,933

(22) Filed: Nov. 21, 2012

(65) Prior Publication Data

US 2014/0139374 A1    May 22, 2014

(51) Int. Cl.
| | |
|---|---|
| *G01S 3/02* | (2006.01) |
| *G01S 5/02* | (2010.01) |
| *G01C 21/16* | (2006.01) |
| *G01S 11/10* | (2006.01) |
| *F41G 3/22* | (2006.01) |

(52) U.S. Cl.
CPC .................. *G01S 5/0294* (2013.01); *F41G 3/22* (2013.01); *G01C 21/165* (2013.01); *G01S 11/10* (2013.01)

(58) Field of Classification Search
CPC ........... G01S 5/04; G01S 3/46; G01S 13/878; G01S 11/10; G01C 21/165; F41G 3/22
USPC .......... 342/45, 357.2, 357.23, 357.25, 357.64
See application file for complete search history.

(56) References Cited

U.S. PATENT DOCUMENTS

| 5,343,209 A | * | 8/1994 | Sennott | ................... G01S 19/42 342/357.29 |
| 6,577,272 B1 | * | 6/2003 | Madden | ................... G01S 3/50 342/387 |

(Continued)

FOREIGN PATENT DOCUMENTS

EP    2187170 A2    5/2010

OTHER PUBLICATIONS

Kutty et al.; "Kalman Filter Using Quantile based Noise Estimation for Audio Restoration"; IEEE International Conference on Emerging Trends in Electrical and Computer Technology; Bangalore University; (2011); pp. 616-620.

(Continued)

*Primary Examiner* — John B Sotomayor
*Assistant Examiner* — Marcus Windrich
(74) *Attorney, Agent, or Firm* — Burns & Levinson LLP; Joseph M. Maraia

(57) ABSTRACT

Accurate remote tracking of fixed objects from a moving platform requires overcoming platform noise. Such tracking becomes difficult when the only inertial reference (such as a central aircraft inertial navigation system) is remote from the sensor, which experiences non-measured angular movements due to airframe vibrations and flexing. In such a scenario, Kalman filtering cannot converge on a true value because all noise sources are not known. Current naïve approaches arbitrarily boost noise with fixed additive or multiplicative factors. However, such approaches slow filter response and; thus, often fail to give timely results. Embodiments of the present disclosure derive inertial reference parameters to quantify noise of the sensor that is remote from the inertial reference. Advantageously, disclosed embodiments enable use of remote sensors with an existing inertial reference, rather than consolidating sensors and the inertial reference at a single location or providing inertial references at each sensor.

28 Claims, 6 Drawing Sheets

(56) References Cited

U.S. PATENT DOCUMENTS

| | | | | |
|---|---|---|---|---|
| 7,286,085 | B2* | 10/2007 | Kolanek | G01S 3/47 342/424 |
| 7,421,343 | B2* | 9/2008 | Hawkinson | G01C 21/16 244/173.2 |
| 8,373,596 | B1* | 2/2013 | Kimball | G01S 5/04 342/444 |
| 2006/0224321 | A1 | 10/2006 | Lund et al. | |
| 2007/0118286 | A1* | 5/2007 | Wang | G01C 3/50 342/357.59 |
| 2012/0313816 | A1* | 12/2012 | Menegozzi | G01S 3/48 342/357.25 |

OTHER PUBLICATIONS

Park et al.; "Dead Reckoning Navigation of a Mobile Robot Using an Indirect Kalman Filter"; IEEE International Conference on Multisensor Fusion and Integration for Intelligent Systems; (1996); pp. 132-138.

Shehata et al.; "Joint Iterative Detection and Phase Noise Estimation Algorithms Using Kalman Filtering"; IEEE; (2009); pp. 165-168.

Sibley et al.; "The Iterated Sigma Point Kalman Filter with Applications to Long Range Stereo"; USC/JPL; Robotics: Science and Systems II; (2007).

Trigo et al.; "Iterated Extended Kalman Filter with Adaptive State Noise Estimation for Electrical Impedance Tomography"; Technology Meets Surgery International (2005).

Verlaan; "Iterative Kalman Filter Using Ensembles"; Delft University of Technology (2009).

Zhang; "Iterated Extended Kalman Filter"; Research Microsoft; (1996).

Welch et al.; "An Introduction to the Kalman Filter"; TR 95-041; Department of Computer Science; University of North Carloina at Chapel Hill; Chapel Hill, NC; (2006).

* cited by examiner

KALMAN FILTERING WITH INDIRECT NOISE MEASUREMENTS

GOVERNMENT SUPPORT

This disclosure was supported, in whole or in part, by Contract No. N68936-05-D-0033 awarded by the Naval Air Warfare Center Weapons Division. The Government may have certain rights in the disclosure.

BACKGROUND

A Kalman filter solves the general problem of estimating true values of variables/states of a linear dynamic system that is perturbed by white noise. It is a key method for improving the accuracy for complex measurement and control systems. Unlike filter designs that are optimized for specific signal and noise frequency spectral characteristics, the Kalman filter constantly adapts to noise in the system measurements and its changes from moment to moment.

The Kalman filter is also known as a linear quadratic estimator (LQE). It is an algorithm that uses a series of input measurements acquired over time. The measurements contain noise (random variations in the measurements) and other errors, and the filter generates estimates of unknown system variables/states that tend to be more precise than those that would be based on a single measurement alone.

The Kalman Filter also solves what are called inversion problems, in which a tentative solution is improved incrementally by comparing sensor inputs with estimates of the input that would be expected from the tentative solution and input data.

The Kalman filter has numerous applications in technology. A common application is for guidance, navigation and control of vehicles, particularly aircraft and spacecraft.

SUMMARY

An embodiment of the present disclosure is a method, system, or computer readable medium, with program codes embodied thereon, for determining from a mobile platform having at least one sensor and a motion sensing device (e.g., an inertial navigation system), a precise indication of a location of a remote emitter. The embodiment receives via the at least one sensor, a respective plurality of sequential sensor input samples. Each sensor input sample is indicative of a respective detected emission from the remote emitter. The embodiment also receives or derives for the at least one sensor a respective indication of sensor noise. In addition, the embodiment receives from the inertial navigation system or other motion sensing device a respective indication of an estimate of platform motion corresponding to each sensor input sample.

Further, the embodiment employs an algorithm that determines, for each sensor input sample of the plurality of sequential sensor input samples, a respective indication of sensor motion noise. For each sensor input sample, the embodiment combines for each sensor input sample of the plurality of sequential sensor input samples, the respective received indications of sensor noise and sensor motion noise. The embodiment also determines a Kalman filtered estimate of the precise indication of a location of the remote emitter responsive to the plurality of sequential sensor input samples, the indication of platform motion, and the combined indications of sensor noise and sensor motion noise.

The embodiment may determine a respective indication of sensor motion noise by receiving, from the inertial navigation system or other motion sensing device, for each sensor input sample of the plurality of sequential sensor input samples, a plurality of angle rate or acceleration (or other departures from an anticipated response without noise) variations for at least one inertial variable. Using the received information (i.e., the plurality of angle rate or acceleration variations), the embodiment may determine a variance of the plurality of angle rate or acceleration variations.

The embodiment may receive the plurality of angle rate variations for at least one inertial variable by receiving a respective plurality of angle rate or acceleration variations for more than one inertial variable and may determine the variance of the plurality of angle rate or acceleration variations by determining a respective variance for each of the more than one inertial variable.

The embodiment may combine each of the respective determined variances of the more than one inertial variable. The embodiment may combine each of the respective determined variances by using a weighted sum. The more than one inertial variable may comprise pitch, yaw and roll inertial variables. Because motion measurements are generally available more frequently than sensor input samples, the embodiment may combine a number of motion measurements to give a smoothed rate or acceleration of motion value at the time of each sensor input sample. Using the received information (e.g., the plurality of angle rate or acceleration variations), the embodiment may determine a variance of the plurality of angle rate or acceleration variations with respect to the smoothed rate or acceleration. In addition, the embodiment may adjust smoothing parameters such as the number, the time spacing or rate, or the weighting of the sensed rates or accelerations, in order to tailor the variance estimate. In one example, the embodiment tailors the variance estimate such that the variance estimate models, to some degree, the structural dynamic flexure of the structure linking the sensor with the motion sensing device. In this manner, the embodiment creates a motion noise estimate applicable to the sensor. In addition, motion noise estimate that is created considers the likely error resulting from taking motion measurements remotely from the sensor. In particular, error may result because the remote measurements are utilized as if the measurements are measurements of motion local to the at least one sensor, In addition, the embodiment may combine the respective received indications of sensor noise and sensor motion noise via a root-sum-square combination. For the at least one sensor, the embodiment may receive a respective indication of an estimate of platform position by sensing a differential Doppler phase rate between two signals received by at least two sensors sometimes called frequency difference of arrival (FDOA). Alternatively, the embodiment may, for the at least one sensor, receive a respective indication of an estimate of platform position by sensing a time difference of arrival (TDOA) between respective signals received by at least two sensors.

Another embodiment of the present disclosure is a method, system, or computer readable medium, with program codes embodied thereon, for determining from a mobile platform having at least two sensors and an inertial navigation system, a precise indication of a location of a remote emitter. The embodiment receives from the at least two sensors a respective plurality of sequential sensor difference samples. Each sensor difference sample is indicative of a time difference of arrival or phase difference of arrival between the signals received by the different sensors. In addition, the embodiment receives a respective indication of sensor noise for at least one sensor. Further, the embodiment receives a respective indication of an estimate of platform motion corresponding to each sensor input sample from the inertial navigation system. The embodiment also calculates an equivalent motion noise from platform motion characteristics measured by an inertial navigation system or inertial measurement unit, or other angle or position sensing device. For example, these measured platform motion characteristics may be associated with an angular rate or acceleration, or with a linear rate or acceleration. The calculations of equivalent motion noise may use one or more such measured characteristic in an equation that also may include numerical differentiation or finite impulse response tailoring. Also, the embodiment, at the time of each sensor input sample of the plurality of sequential sensor input samples, determines a respective indication of estimated error based on a current estimated emitter location and platform motion.

Additionally, for each sensor input sample of the plurality of sequential sensor input samples, the embodiment combines respective received indications of sensor noise and sensor motion noise. The embodiment also determines a Kalman filtered estimate of the precise indication of a location of the remote emitter responsive to the plurality of sequential sensor input samples, the indication of platform motion, and the combined indications of sensor noise and sensor motion noise.

The tracking methods and systems described herein (hereinafter "technology") can provide one or more of the following advantages. One advantage is that estimating noise associated with a mobile platform provides more accurate location estimates for a remote emitter because the estimated noise is used in the remote emitter location estimation process. An additional advantage is that the technology enables use of remote sensors with an existing inertial reference of a mobile platform, rather than consolidating sensors and the inertial reference at a single location or providing inertial references at each sensor. Further, cost for implementing the technology is reduced because the technology can be implemented in an existing mobile platform without having to add/remove equipment to/from the mobile platform.

It should be understood that embodiments of the present disclosure can be implemented in the form of a method, system, apparatus, or computer readable medium with program codes embodied thereon, for maximum location detection. For ease of reading, the term "system" is used in various portions of the description and may represent some or all forms of embodiments and implementations of the present disclosure, such as systems, method, apparatuses, devices, computer readable media, network nodes, and networks.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

Figure 1:
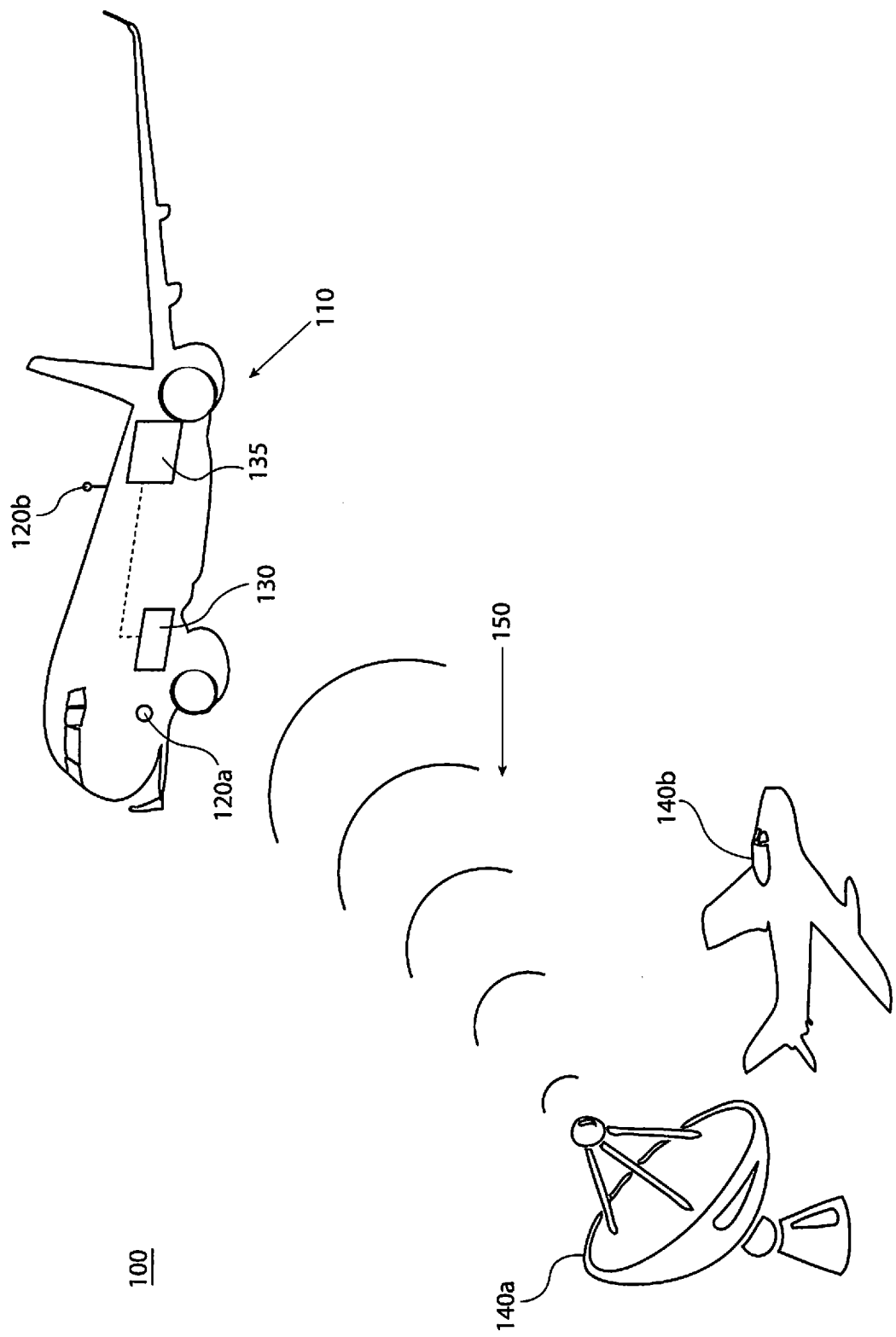
FIG. 1 is a schematic illustration of an environment in which a mobile platform (e.g., a plane) remotely tracks a fixed object (e.g., a remote emitter) via a location detector in accordance with an example embodiment of the present disclosure.

A description of example embodiments of the disclosure follows.

Accurate remote tracking of fixed objects from a moving platform (e.g., a plane) requires overcoming platform noise, which is difficult when the only inertial reference (e.g., a central aircraft inertial navigation system) is remote from a sensor(s) (e.g., an antenna). In this case, the sensor experiences non-measured angular movements due to airframe vibrations and flexing of the moving platform. Such movements create sensor outputs that are influenced by sensor motion. Such sensor motion may differ from motion as sensed at another location on the airframe or another linking structure. This difference between the sensor motion and remotely sensed motion gives errors when the sensor signals are compared with motion sensor signals (as determined by a remote motion sensor). This difference introduces unanticipated noise in the motion measurements, relative to the motion that is sensed by the sensor(s), but not by the inertial navigation system or other remotely located inertial reference. When noise (e.g., all noise sources) is known, Kalman filtering can converge on an accurate value (e.g., sensed data without noise), but becomes less effective and may fail when noise is erratic and not well predicted (e.g., due to flexing and vibrations of the moving platform). Thus, in conditions where noise is unanticipated, tracking accuracy using Kalman filtering is severely compromised.

In one approach, tracking accuracy may be improved by including an inertial reference at the sensor(s). In such a scenario, the inertial reference is able to monitor the movement of angular movements of the sensor(s) due to the vibrations and flexing of the moving platform and provide information as to the noise caused by such vibrations and flexing. With such input, Kalman filtering can converge on a true value (e.g., sensed data without noise). However, such an approach is costly and may require the introduction/removal of equipment (e.g., inertial references, electronic interfaces, etc.). In an alternative approach, the sensor(s) and the inertial reference may be consolidated at a single location. By consolidating at a single location, accurate measurements can be made for the noise due to vibrations and flexing. Again, such a scenario is costly and may require the introduction/removal of equipment on the moving platform.

In another approach, tracking accuracy can be improved by creating an equivalent noise measure for the Kalman noise input, but this fails when there are noises that are not predicted. Arbitrarily boosting noise with fixed additive or multiplicative factors may improve Kalman accuracy. However, such boosting slows filter response and, thus, often fails to give timely results. Such fixed noise boosts also fail to prevent divergence in the estimation due to badly corrupted outlier measurements.

Embodiments of the present disclosure derive inertial reference parameters at the sensor(s) to quantify noise of the sensor that is remote from the inertial reference. For instance, embodiments sample the inertial reference (e.g., at rates faster than the sensor samples), and interpret variance in over a short time interval prior to each sensor sample as navigation noise. In this case, the navigation noise represents angular motions, for example, at frequencies higher than can be propagated coherently through the airframe to the sensor(s). At lower frequencies, the navigation sensor data better measures sensor motion. This indirect navigation noise measurement, which is properly scaled and combined with sensor noise, gives a more complete and accurate noise input to a Kalman filter, thereby improving accuracy of the filter, eliminating divergence, speeding convergence, and improving measurement accuracy.

Advantageously, disclosed embodiments enable use of remote sensors with an existing inertial reference, rather than consolidating sensors and the inertial reference at a single location or providing inertial references at each sensor.

FIG. 1 illustrates an environment 100 in which a mobile platform (e.g., an airplane) 110 remotely tracks a fixed object 140a (e.g., a fixed remote emitter) or a moving object 140b (e.g., an aircraft or other moving remote emitter) using a location detector 135. As illustrated, the environment 100 includes a mobile platform 110 having an inertial navigation system 130 that receives (e.g., senses) emissions 150 via at least one of the sensors 120a-b from the remote emitter 140a or moving object 140b. As an example, tracking of the fixed object 140a or moving object 140b may be utilized in weapon targeting systems in order to locate and track targets. As another example, tracking of a remote emitter 140a (e.g., rescue beacon or surveillance radar or tracking radar) may be utilized in order to facilitate search and rescue missions that require an accurate indication of the location of the remote emitter 140. In some embodiments, the emitter 140a may be sonic, as would be used by a sonar system. In other embodiments, the remote emitter 140a may be a reflector as used by a semiactive radar or ladar system. In another example, tracking of the moving object 140b (e.g., an aircraft or missile) may be utilized in order to facilitate locating and destroying the moving object 140b.

Although, the mobile platform 110 is illustrated as a plane, the mobile platform may be any type of a mobile vehicle (e.g., land-based, air-based, or sea-based). The remote emitter 140a may be an antenna that transmits RF signals. The remote emitter 140a may also be a reflector that is illuminated by a transmitter of an active radar or lidar system. In all cases where sensor motion is not measured directly, the above-described indirect motion noise measurements may be used to improve accuracy of a Kalman filter that is used to derive accurate sensor outputs in some angle, position, or distance coordinate system. It should also be noted that, while two sensors 120a-b are depicted, a single sensor or three or more sensors may be employed. The sensors 120a-b may be separated by a measurement baseline, which is the geometric line between any two sensors.

Motions of the platform 110 at the sensors 120a-b, which are remote from the inertial navigation system 130, can differ from those at the navigation system 130, particularly at higher frequencies where airframe flexure and resonance become significant. The difference in motion causes the phase and amplitude of motions at one sensor (e.g., sensor 120a) to differ from those of motions at other sensors (e.g., 120b) or the navigation system 130. Desirably, such motions would be measured at each sensor, but this often is not done or possible with existing equipment. Alternatively, these motions could be calculated from navigation system data; however, this is not practical because calculations of the effects of structural dynamics of the airframe are complex, and turbulent air forces also are not measured. Hence, at some frequencies of interest, there is no direct measure of sensor position and orientation. In essence, the navigation system data may be corrupted by noise that cannot be measured. This problem may be solved by estimating navigation system noise through indirect measurements as will be described below.

In the environment 100, the sensors 120a-b receive a respective plurality of sequential sensor input samples (e.g., RF signals) from the remote emitter 140a. Each sensor input sample is indicative of a respective emission 150 from the remote emitter 140a at various times. A processor (e.g., processor 220 of FIG. 2) coupled to the sensors 120a-b receives the samples and calculates, for example, an average or least-mean-square function fit to the time varying data. In addition, the processor calculates a variance about this average. The calculated data provides a respective indication of sensor signal and sensor noise. The location detector 135 receives, for at least one of the sensors 120a-b, the respective indication of sensor signal and sensor noise. In addition, the location detector 135 receives, from the inertial navigation system 130, a respective indication of an estimate of platform motion corresponding to each sensor input sample. The location detector 135 determines, for each sensor input sample of the plurality of sequential sensor input samples, a respective indication of sensor motion.

As stated herein, when the sensor(s) 120a-b are not co-located with a corresponding motion measuring device (e.g., inertial navigation system 130), flexure or bending of the physical structure between the sensor(s) 120a-b and the motion measuring device may introduce motion measurement errors or motion noise. Even if the motion measuring device perfectly senses motion at its own location, the measured motion may be vastly different than motion at the sensor(s) 120a-120b. Thus, the output of the motion measuring device contains errors or noise with respect to motion at the sensor(s) 120a-120b. For example, the physical structure of an aircraft may flex in response to aerodynamic buffeting, or other effects. Similarly, the frame of a ship or vehicle may twist as it traverses rough seas or rough terrain.

Further, the location detector 135, for each sensor input sample of the plurality of sequential sensor input samples, combines the respective received indications of sensor noise and sensor motion noise. The location detector 135 may combine the respective received indications of sensor noise and sensor motion noise by using, for example, a root-sum-square combination, variance addition, or covariance matrix calculations, or any other suitable statistical analysis technique to account for uncertainties in data. Responsive to the plurality of sequential sensor input samples, the indication of platform motion, and the combined indications of sensor noise and sensor motion noise, the location detector 135 determines a Kalman filtered estimate of the precise indication of a location of the remote emitter 140.

The location detector 135 may determine a respective indication of sensor motion noise by receiving from the inertial navigation system, for each sensor input sample of the plurality of sequential sensor input samples, a plurality of angle rate or acceleration variations for at least one inertial variable. For instance, the inertial variable may be at least one of the following: pitch, yaw and roll. The location detector 135 then determines a variance of the plurality of angle rate or acceleration variations from the plurality of angle rate or acceleration rate variations.

Since motion measurements are generally available more frequently than the sensor input samples, the location detector 135 may combine a number of motion measurements to give a smoothed rate or acceleration at the time of each sensor motion sample. The location detector 135 may use the smoothed rate or acceleration to calculate the variance of angle rate or acceleration variations. In addition, the location detector 135 may adjust smoothing parameters like the number, the time spacing or rate, or the weighting of these sensed rates or accelerations, in order to tailor the variance estimate such that it models, to some degree, the structural dynamic flexure of the structure linking the sensor with the motion sensing device. In this manner, the location detector 135 determines to a motion noise estimate associated with motion at the sensor(s) 120a-b. The motion estimate factors in a likely error resulting from using motion measurements that are captured remotely from the sensor(s) 120a-b.

Alternatively, the location detector 135 may receive a respective plurality of angle rate or acceleration variations for more than one inertial variable and determine the variance of the plurality of angle rate or acceleration variations by determining a respective variance for each of the inertial variables.

The location detector 135 may also combine each of the respective determined variances of the more than one inertial variable (e.g., pitch, yaw, and roll), for example, by using a weighted sum. For instance, in a scenario where the mobile platform (e.g., aircraft) 110 has a flight path that is characterized as being generally straight and level the weighting factors may be determined through empirical data. In one instance, for the inertial variables pitch, yaw, and roll, a 4-1-6 weighting is utilized (as described with respect to FIG. 6). The location detector 135 may select weighting factors in order to emphasize certain variables relative to other variables. For example, if yaw motions have a greater effect on estimating location, it may be desirable to weight that variable more heavily than the pitch and roll variables. Also, the location detector 135 may calculate a single weight from the estimated emitter direction by combining multiple-axis noise estimates in accordance with their theoretical disturbance of a line-of-sight to the emitter 140a. Additionally, the location detector 135 may calculate multiple weights as a covariance matrix.

Advantageously, the location detector 135 does not require detailed information associated with structural dynamics of the mobile platform in order to determine the weights. In contrast, current systems require such information. However, such systems are costly and time intensive because processing such information is resource intensive due to the fact that the mobile platform may be too structurally complex for the system to model precisely. Alternatively, the information may be proprietary and, thus, unavailable. The location detector 135, without needing an elaborate dynamics model, can base the weights on far simpler equations that are adequate to yield an approximate noise estimate. In an example, the location detector 135 can determine the weights empirically by using measured sensor data. For instance, the location detector 135 input the measured sensor data into Monte-Carlo or other simulations to determine optimum weights on the basis of simulated performance.

It should be noted that these fixed parameters could be changed for different three-dimensional geometries of aircraft and target. These parameters also can be continuously calculated, particularly for applications with other maneuvers or geometries of sensor(s) location. Alternatively, fixed weights can be applied to the motion data by sensing the presence of motion noise on a single axis. Such motion noise is indicative of structural vibrations that flex the structure connecting the motion measuring device 130 and the sensor(s) 120a-b.

In addition, the location detector 135 may receive, for the sensors 120a-b, a respective indication of an estimate of platform position by sensing differential Doppler phase rate between two signals received by the sensors 120a-b. Alternatively, the location detector 135 may receive, for the sensors 120a-b, a respective indication of an estimate of platform position by sensing time difference of arrival (TDOA) between respective signals received by the sensors 120a-b.

As stated above, location determination may be based on differential Doppler rates caused by aircraft (e.g., mobile platform 110) motion. For instance, aircraft maneuvers give rise to differential velocities along a sightline to the remote emitter 140. These signals are processed coherently to extract precise bearing and range to the remote emitter 140.

Generally, the remote emitter signal 150 is received through two antennas (e.g., sensors 120a-b) separated by a certain baseline distance (e.g., 'd'). As the aircraft 110 rotates through an angle rate about an axis perpendicular to the plane defined by the two antennas 120a-b and the emitter 140, an angular rate $d\Omega/dt$, causes a velocity of the baseline between port 120a and aft antenna 120b to have a rotational or angular velocity of $V_{ROTATION} = d\Omega/dt \cdot d/2$, where d is the separation of the antennas perpendicular to the line-of-sight to the emitter 140. The forward fuselage antenna 120a has a velocity that is in the opposite direction (i.e., the velocity has the same value but opposite sign). Thus, the difference in velocity is $2 \cdot V_{ROTATION}$, or $d \cdot d\Omega/dt$. It should be noted that the aircraft linear velocity, for example, $V_{TRANSLATION}$, cancels in the difference velocity calculation, so the resultant FDOA signal accurately represents a turning rate of the baseline as sensed by a radar. The FDOA is compared with an FDOA calculated from an estimated emitter location and the motion measured by the physical motion sensor; the difference between measured and estimated FDOA then is used with Kalman Filter geometric calculations to improve the emitter location estimate.

Differential measurements are performed on signals in order to cancel common-mode noises. Time Difference of Arrival (TDOA) is measured for individual pulses, and is made more accurate by combining pulses over a dwell. Further processing uses TDOA to eliminate the effect of cable-length propagation delays. The time derivative of TDOA change is the Frequency Difference of Arrival (FDOA), which measures the different phase rate of change between the two antenna signals that results from Doppler shifts due to the velocities projected in the direction to the emitter. This differential velocity can be decomposed into rotational and translational components. The rotational component depends on aircraft turning rate, and is effective at all ranges. The translational component depends on the emitter angle between the antennas, and can be significant at close range.

Combined with rates and position information from the aircraft inertial navigation system (INS) (e.g., inertial navigation system 130), FDOA corresponds to a line of possible emitter locations on the surface of the Earth. As the aircraft 110 maneuvers and traverses its flight path, this line changes, and successive lines intersect at a point where the emitter is located.

Figure 6:
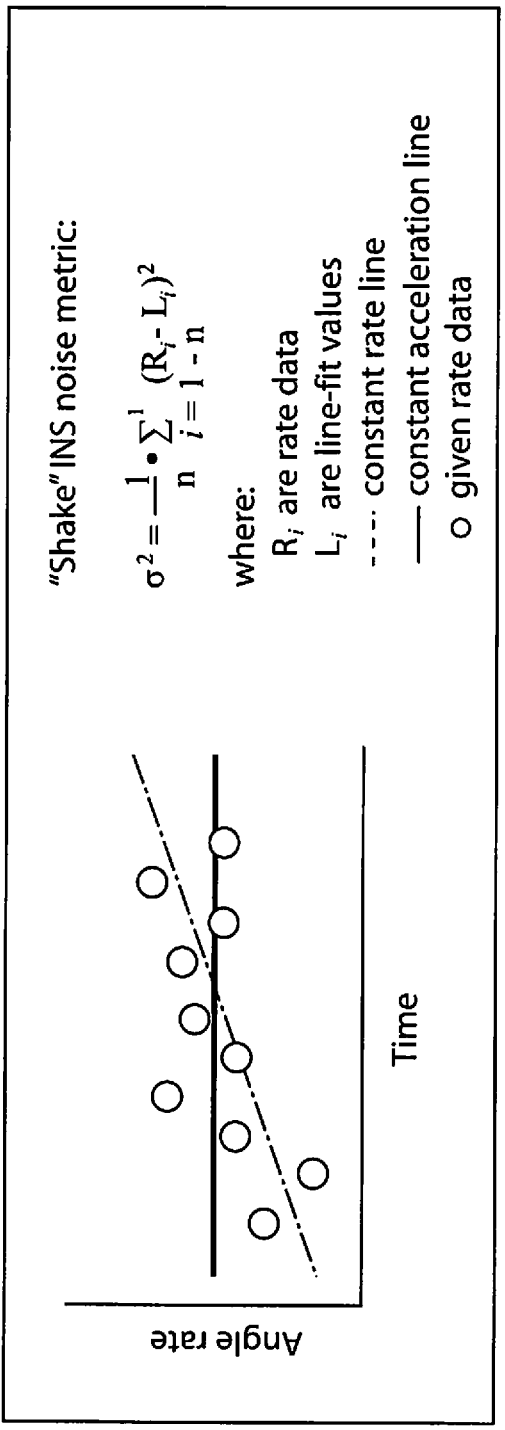
FIG. 6 illustrates a graph that plots shake variance, in an exemplary embodiment.

In the above mentioned example, the sensors 120a-b, generally, experience motion noise, but have no gyro or accelerometer or other instrumentation to sense motions of the sensors 120a-b directly. This difficulty is overcome by determining a "shake" parameter, which estimates the physical jitter at the antennas 120a-b via the location detector 135. Moreover, this estimate is based on aircraft motions at the inertial navigation system 130 (e.g., navigation sensor), which is located elsewhere on the mobile platform 110. More specifically, "shake" is quantified as the variance at every sensor measurement as the variance in angle rates, within a selective frequency band. As seen in FIG. 6, which illustrates a graph 600 that plots angle rate variance vents time, over a sequence of several motion measurements occurring at or near the time of one sensor measurement. As illustrated here, motion noise variance 610 is determined based on departure from the average angle rate, or alternatively on rate departure from a straight-line-fit of constant angle acceleration. Although single-axis angle rate measurements are illustrated in this figure, the method can be applied to multiple angle rate measurements, or to linear rate or acceleration measurements, or to any combination of these. A final motion noise metric is ideally a combination of such measurements weighted in accordance with a vehicle structural dynamics model. In practice, vehicle manufacturers are reluctant to provide such models. However, weighting may be developed empirically, as described earlier.

Figure 2:
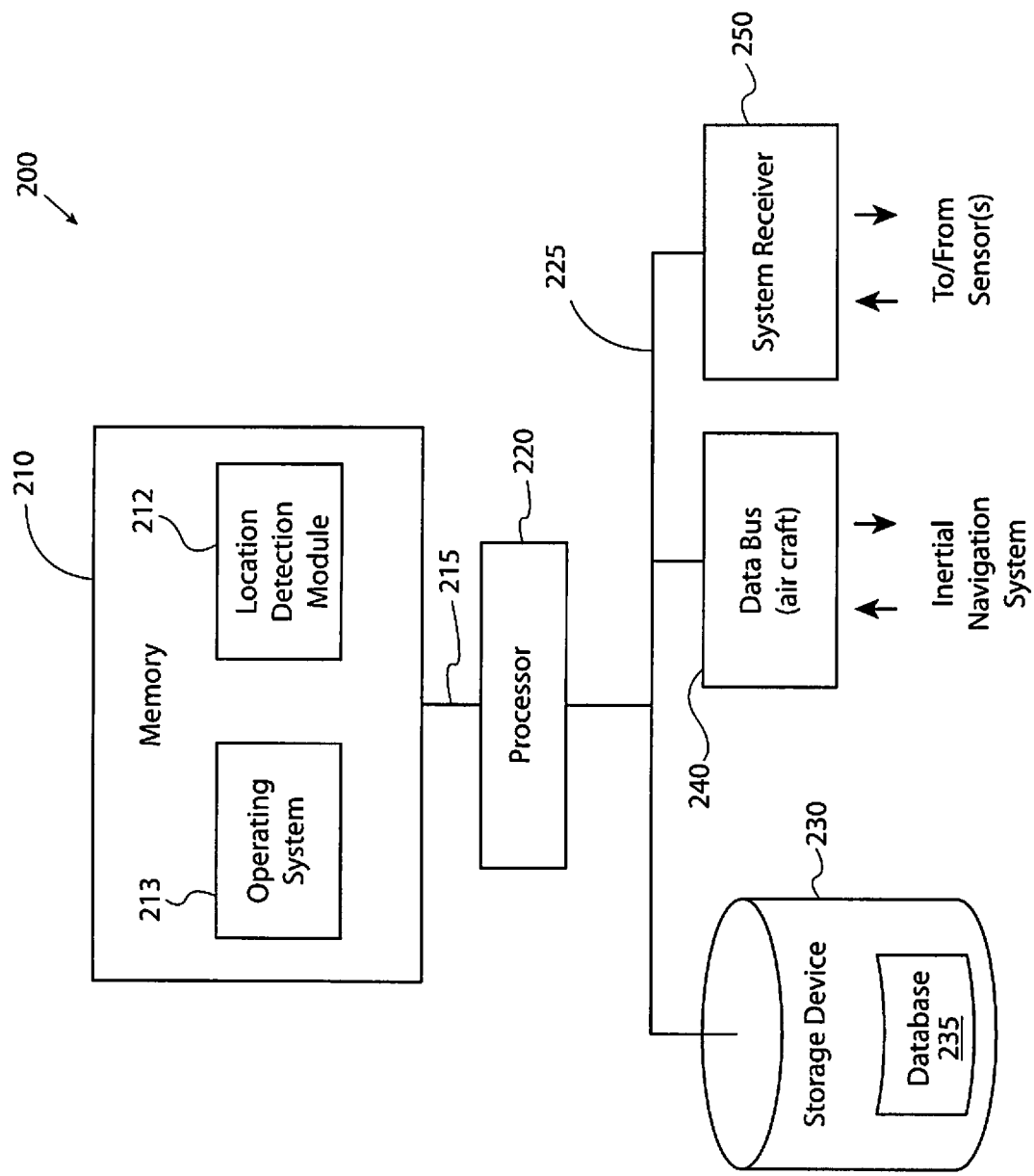
FIG. 2 is a block diagram of a location detector in accordance with an example embodiment of the present disclosure.

FIG. 2 is a block diagram of a location detector 200 that may be used in connection with an embodiment of the present disclosure. The location detector 200 includes a memory 210 coupled to a processor 220 via a memory bus 215, and a storage device 230, external data bus 240, and an receiver 250 coupled to the processor 220 via an input/output (I/O) bus 225. It should be noted that the location detector 200 may include other devices, such as keyboards, display units and the like. The receiver 250 and the data bus 240 interfaces the location detector 200 to sensor(s) (e.g., sensors 120a-b) and an inertial navigation system (e.g., inertial navigation system 130) and enables data (e.g., packets) to be transferred between the location detector 200 and the sensor(s) and the inertial navigation system 130. The network interface 140 may include conventional circuitry that incorporates signal, electrical and mechanical characteristics, and interchange circuits to interface with physical media of the sensor(s) and inertial navigation system and protocols running over that media. The storage device 230 is a conventional storage device (e.g., a disk) capable of storing, inter alia, sensor input samples, indications of sensor noise, indications of platform motion, sensor motion noise, and combined indications of sensor noise and sensor motion noise.

The memory 210 is an example computer-readable medium, optionally implemented as a RAM employing RAM devices, such as DRAM devices and/or flash memory devices. The memory 210 contains various software and data structures used by processor 220, such as software and data structures used by the processor 220, such as software and data structures that implement aspects of the present disclosure. Specifically, the memory 210 may store software configured to serve as an operating system 213 or provide a location detection module 212. The operating system 213 can be used to functionally organize the location detector 200 by invoking operations in support of processes and services executing on the location detector 200, such as location detection module 212. The location detection module 212, as will be described below, may include non-transitory computer-executable instructions for determining a location of a remote emitter.

The storage device 230 may include a database 235, which may be implemented in the form of a data structure that is configured to hold various information used for local maxima detection, such as sensor input samples, indications of sensor noise, indications of platform motion, sensor motion noise, and combined indications of sensor noise and sensor motion noise.

Figure 3:
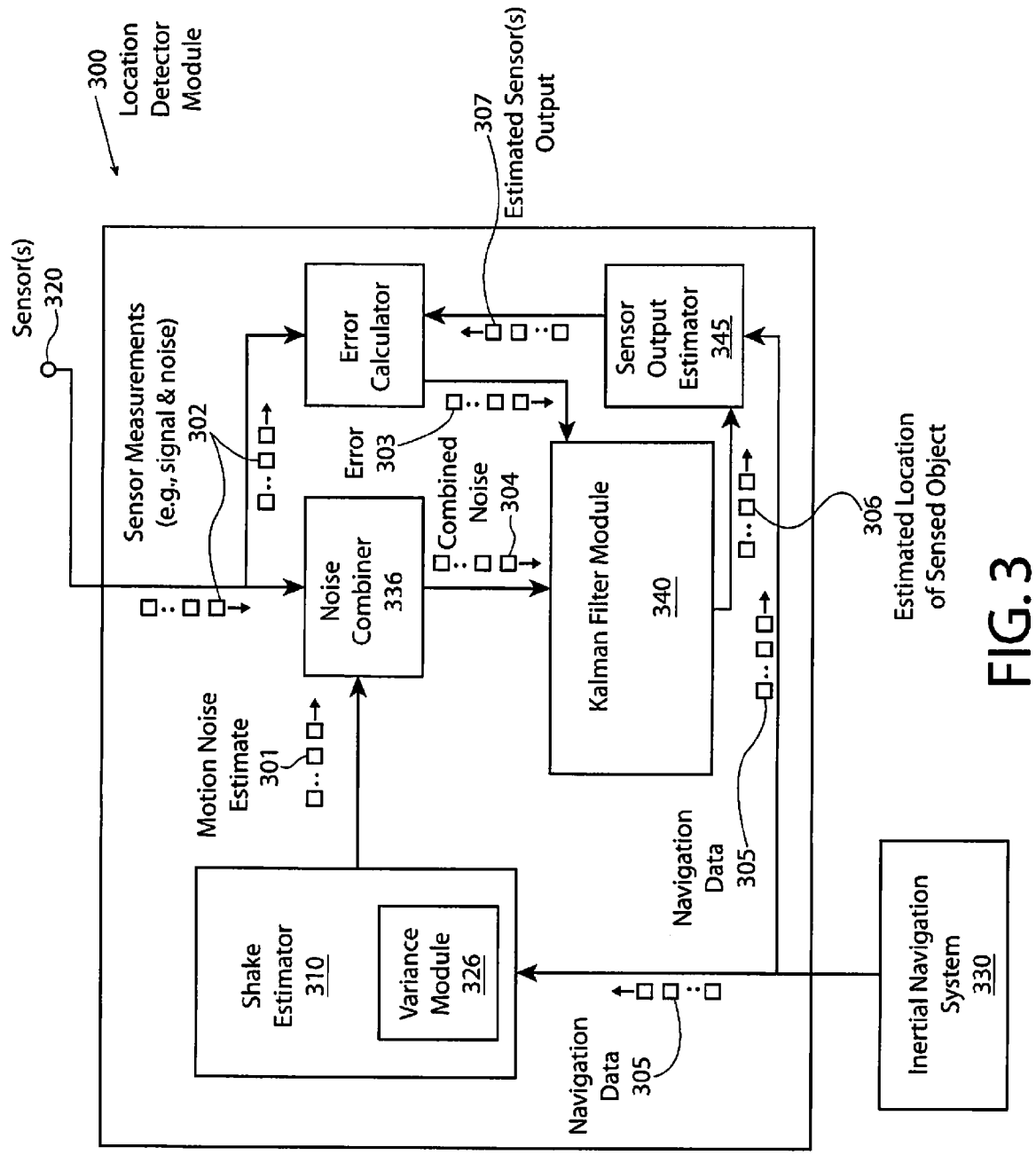
FIG. 3 is a block diagram of a location detection module in accordance with an example embodiment of the present disclosure.

FIG. 3 is a block diagram of a location detection module 300 in accordance with an example embodiment of the present disclosure. The location detection module 300 receives data from sensor(s) 320 and inertial navigation system 330. In order to process the received data, the location detection module 300 utilizes a shake estimator 310, variance module 326, noise combiner 336, Kalman filter module 340, sensor output estimator 345, and error calculator 350.

The sensor(s) 320 input a respective plurality of sequential sensor input samples (e.g., sensor measurements) 302 to the location detection module 300. In particular, the noise combiner 336 and error calculator 350 receive the sensor measurements 320 Each sensor input sample is indicative of a respective detected emission from a remote emitter. The sensor(s) 320 may be two or more sensors separated along a measurement baseline of a mobile platform (e.g., an airplane). In such an example, each sensor of the sensor(s) 320 has an associated sensor noise. It should be noted that the sensor(s) 320 may be at least one an antenna configured to electromagnetically detect the remote emitter. Alternatively, the sensor(s) 320 may be at least one optical detector configured to optically detect the remote emitter.

The inertial navigation system 330 provides an indication (e.g., navigation data 305) of an estimate of platform motion (e.g., motion of a plane (mobile platform)) to the sensor output estimator 345 and the shake estimator 320. The FDOA (i.e., sensor output) estimator 345 receives the navigation data 305 and calculates an estimate for the output of the sensor(s) 320 (e.g., sensor measurements 302) by calculating differential changes in path length from the emitter 140a to each sensor, based on the each sensor 120a-b based on a current estimated location 306 of the emitter 140a.

The shake estimator 310 is in communication with the inertial navigation system 330. For each sensor input sample of the plurality of sequential sensor input samples, the shake estimator 310 determines a respective estimate of positional error between a position estimate based on the inertial navigation system 330 and a positional estimate based on the sensor(s) 320 (e.g., "shake" measurements). In addition, the shake estimator 310 includes the variance module 326, which is configured to determine, for each sequential sensor input sample, and for at least one inertial variable, a respective variance of a respective plurality of angle rate or angle acceleration variations received from the inertial navigation system 330.

In particular, the shake estimator 310 receives from the inertial navigation system 330 a respective indication of an estimate of platform motion corresponding to each sensor input sample. Further, shake estimator, using variance data derived from the variance module, determines, for each sensor input sample of the plurality of sequential sensor input samples 302, a respective indication of sensor motion noise (e.g., motion noise estimate 301). The shake estimator 310 provides the indication of sensor motion noise 301 to the noise combiner 336.

For example, the shake estimator 310 estimates the sensor motion noise 301 from angular accelerations about the aircraft pitch, yaw, and roll axes, and numerical differentiation and bandpass filtering of angle rate data from the inertial navigation system 330.

The noise combiner 336, which is in communication with the at least one sensor, the shake estimator 310, and the Kalman filter module 340, is configured to combine the sensor noise 302 and the motion noise estimate 301. For instance, the noise combiner 336 may combine the sensor noise 302 and sensor motion noise using a root-sum-square combination technique. The noise combiner 336 then provides the combined noise data 304 to the Kalman filter module 340.

As stated above, the error calculator 350 receives the sensor measurements 302 from sensor(s) 320. In addition, the error calculator 350 receives the estimated sensor(s) output 307. The error calculator 350 then compares the sensor measurement 302 and the estimated sensor(s) output 307 to determine an error 303 between the two measurements. This error is used in calculations made with further geometry and the Kalman Filter to improve upon estimated location 306.

Figure 4:
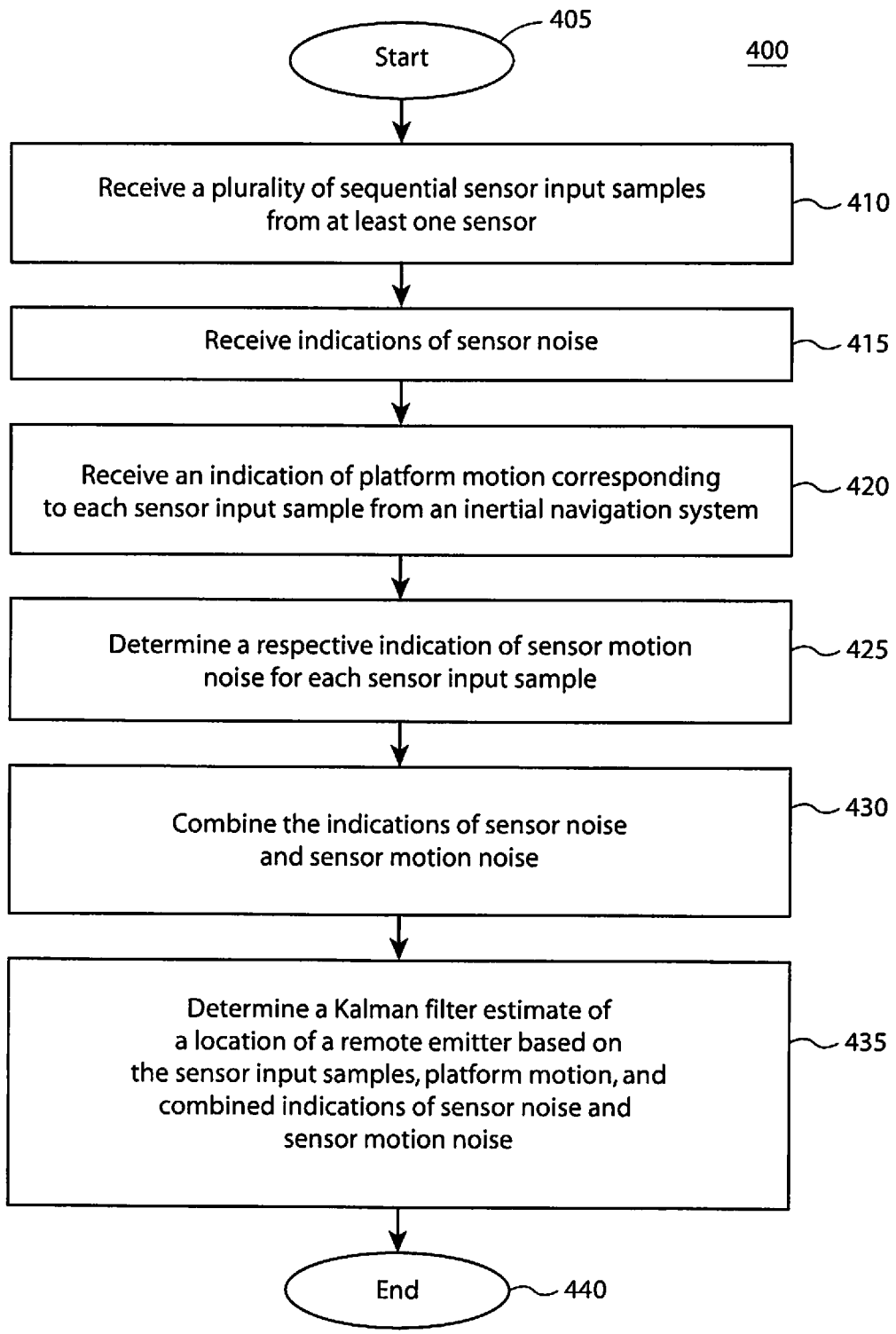
FIG. 4 is a flow diagram of an example method for determining a precise location of a remote emitter according to an example embodiment of the present disclosure.

The Kalman filter module 340, which is in communication with the sensor(s) 320, the inertial navigation system 340, and the shake estimator 310, is configured to determine a solution indicative of a precise indication of a location of the remote emitter responsive to the plurality of sequential sensor input samples, the indication of an updated platform position, and combined indications of sensor noise and sensor motion noise. In particular, the Kalman filter module 340 receives the combined noise data 304 and the error data 303. Using the received data, the Kalman filter module 340 improves upon solution 306 of the location of the remote emitter. Over time, as typical of Kalman processing, this refinement with each data sample improves the solution progressively over time FIG. 4 is a flow diagram of an example method 400 for determining a precise location of a remote emitter according to an example embodiment of the present disclosure. At 405, the method 400 begins. At 410, the method 400 receives by at least one sensor, a respective plurality of sequential sensor input samples, where each sensor input sample is indicative of a respective detected emission from a remote emitter. For the at least one sensor, at 415, the method 400 receives a respective indication of sensor noise. At 420, the method 400 receives a respective indication of an estimate of platform motion corresponding to each sensor input sample from an inertial navigation system. In addition, the method 400, at 425, determines, for each sensor input sample of the plurality of sequential sensor input samples, a respective indication of sensor motion noise. Also, at 430, the method 400, for each sensor input sample of the plurality of sequential sensor input samples, combines the respective received indications of sensor noise and sensor motion noise. At 435, the method 400 determines a Kalman filtered estimate of a precise indication of a location of the remote emitter based on the plurality of sequential sensor input samples, the indication of platform motion, and the combined indications of sensor noise and sensor motion noise. At 440, method 400 ends.

With respect to action 435 of method 400 described above, the Kalman filtered estimate may be determined using a conventional Kalman filter. In particular, the Kalman filter combines a tentative solution for location of the remote emitter with navigation data of a mobile platform (e.g., an aircraft) and motion noise at the sensor(s) in geometric equations that estimate an expected output of the sensor(s) of the mobile platform. This estimate is then compared with a measured value actually produced by the sensor(s) to give an error input to the Kalman Filter. The noise in the sensor measurement and the motion noise at the sensor(s) is applied as the Kalman noise input. As stated above, the sensor(s) motion noise refers to an estimated sensor(s) motion noise due to platform motion at the sensor(s). The sensor(s) motion noise may be estimated from angular acceleration about an aircraft's pitch, yaw, and roll axes, and includes numerical differentiation and band-pass filtering of angle rate data from an inertial navigation system of the aircraft.

By combining error and noise, the Kalman filter improves its location solution. Successive observations by the sensor(s) are compared with estimates derived from navigation data and the latest location estimate in order to converge on an accurate estimate of location.

Figure 5:
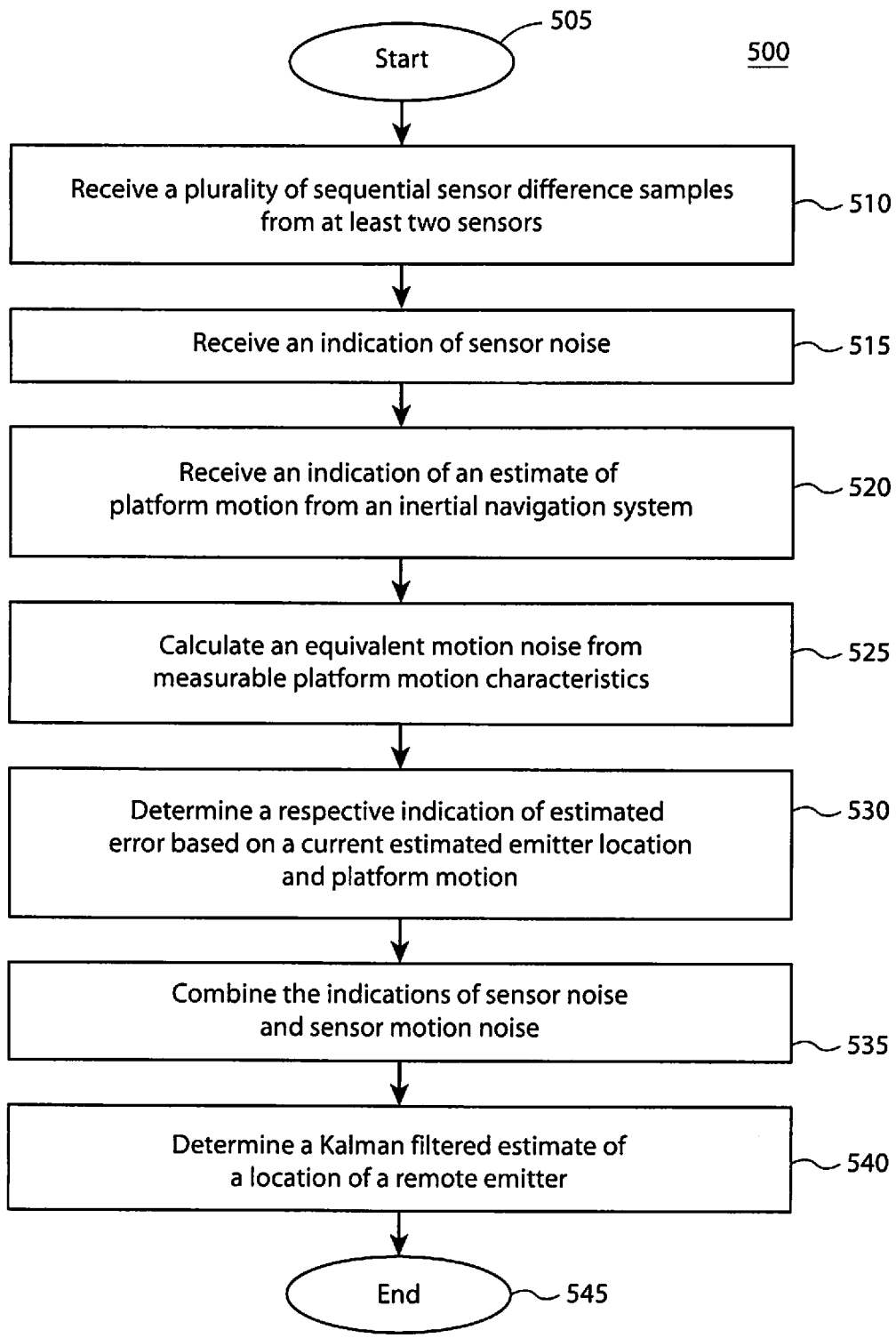
FIG. 5 is a flow diagram of another example method for determining a precise location of a remote emitter in accordance with an example embodiment of the present disclosure.

FIG. 5 is a flow diagram of another example method 500 for determining a precise location of a remote emitter in accordance with an example embodiment of the present disclosure. At 505, method 500 begins. At 510, method 500 receives, by at least two sensors, a respective plurality of sequential sensor difference samples, where each sensor difference sample is indicative of a time difference of arrival or phase difference of arrival between signals received by the different sensors. For at least one sensor, the method 500, at 515, receives an indication of sensor noise. The method 500, at 520, receives a respective indication of an estimate of platform motion corresponding to each sensor input sample from an inertial navigation system. In addition, method 500, at 525, calculates an equivalent motion noise from measurable platform motion characteristics. Also, method 500, at 530, determines, at a time of each sensor input sample of the plurality of sequential sensor input samples, a respective indication of estimated error based on a current estimated emitter location and platform motion. Further, at 535, method 500, for each sensor input sample of the plurality of sequential sensor input samples, combines the respective received indications of sensor noise and sensor motion noise. Contemporaneously, method 500, at 540, determines a Kalman filtered estimate of the precise indication of a location of the remote emitter based on the plurality of sequential sensor input samples, the indication of platform motion, and the combined indications of sensor noise and sensor motion noise. At 545, method 500 ends.

Further example embodiments of the present disclosure may be configured using a computer program product; for example, controls may be programmed in software for implementing example embodiments of the present disclosure. Further example embodiments of the present disclosure may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the disclosure.

The teachings of all patents, published applications and references cited herein are incorporated by reference in their entirety.

While this disclosure has been particularly shown and described with references to example embodiments thereof, it will be understood by those skilled in the art that various changes in form and details may be made therein without departing from the scope of the disclosure encompassed by the appended claims.

What is claimed is:

1. A method for determining from a mobile platform connecting at least one radiation sensor of radiation from a remote emitter and a motion sensing device, a precise indication of a location of the remote emitter, the method comprising:

calculating an initial estimate of a location of the remote emitter;

receiving by the at least one radiation sensor, a respective plurality of sequential sensor data samples, each sensor data sample indicative of a sequential detected emission from the remote emitter;

determining for the at least one sensor a respective indication of radiation sensor noise corresponding to each sensor data sample;

receiving from the motion sensing device a plurality of sequential mobile platform position and motion data samples over a predetermined time span that includes and precedes the sampling time of said sensor data samples, including one or more motion parameters;

determining position and motion values at the sampling time associated with each sensor data sample, based on the plurality of sequential mobile platform position and motion data samples;

determining a best-fit line or other fitting function for the plurality of motion values that reduces rapid data fluctuations that are not well conducted by a structure connecting the motion sensing device and the radiation sensor;

determining for the motion sensing device a respective indication of motion sensor noise corresponding to each motion data sample;

determining for each motion value a respective shake noise, based on differences between one or more of the motion data samples and one or more corresponding best-fit line or other fitting function;

combining for each of the sensor data samples, the respective indications of radiation sensor noise, motion sensor noise, and shake motion noise;

predicting radiation sensor values at the sampling time associated with each radiation sensor data sample, based on the position and motion values for an estimated emitter location;

determining an error value for each radiation sensor data sample, as a difference between the measured radiation sensor data value and the predicted radiation sensor value; and determining through coordinate transformation and iteration a Kalman filtered estimate of the precise indication of a location of the remote emitter that is responsive to the corresponding pluralities of sequential determined error values and combined noise values.

2. The method of claim 1, wherein determining a respective indication of sensor motion noise comprises:

receiving from the motion sensing device, for each sensor data sample of the plurality of sequential sensor data samples, a plurality of rate or acceleration variations for at least one inertial variable; and determining a shake motion noise value from the plurality of rate or acceleration variations, as a variance of the plurality of rate or acceleration variations over a selected time span.

3. The method of claim 2, wherein receiving the plurality of rate or acceleration variations for at least one inertial variable comprises receiving a respective plurality of rate or acceleration variations for more than one inertial variable, and wherein determining the variance of the plurality of angle rate or acceleration variations comprises determining a respective variance for each the more than one inertial variable.

4. The method of claim 3, further comprising combining each of the respective determined variances of the more than one inertial variable.

5. The method of claim 4, wherein combining comprises using a weighted sum.

6. The method of claim 3, wherein the more than one inertial variable comprise pitch, yaw and roll inertial variables.

7. The method of claim 1, wherein combining the respective received indications of sensor noise and sensor motion noise comprises a root-sum-square combination.

8. The method of claim 1, further comprising receiving for the at least two sensors a respective indication of an estimate of platform position by sensing differential Doppler phase rate between two signals received by the at least two sensors.

9. The method of claim 1, further comprising receiving for the at least one sensor a respective indication of an estimate of platform position by sensing time difference of arrival (TDOA) between respective sequential sensor data sample received by the at least one sensors.

10. A system for determining from a moving platform, a precise indication of a location of a remote emitter, comprising:

at least one sensor receiving a respective plurality of sequential sensor data samples, each sensor data sample indicative of a respective detected emission from the remote emitter, each of the sensor data samples having an associated sensor noise;

a motion sensing device providing for each sensor data sample a plurality of sequential mobile platform position and motion data samples over a predetermined time span that includes and precedes the sampling time of said sensor data sample, including one or more motion parameters;

a sensor output estimator in communication with the motion sensor device and a Kalman filter module, the sensor output estimator determining position and motion values at the sampling time associated with each sensor data sample, based on the plurality of sequential mobile platform position and motion data samples;

a shake estimator in communication with the motion sensing device, the shake estimator determining for each motion value a respective motion noise, based on differences between one or more of the motion parameters and its corresponding plurality of measured values;

a noise combiner in communication with the motion sensing device, the shake estimator and the at least one sensor, the noise combiner combining for each of the sensor data samples, the respective indications of sensor noise and motion noise;

an error calculator in communication with the motion sensing device, the shake estimator, the noise combiner, and the at least one sensor, the error calculator determining an error value for each sensor data sample, as a difference between the measured sensor data sample and an estimated sensor value that is calculated from the position and motion values determined at the sampling time for the respective sensor data sample;

a Kalman filter module in communication with the at least one sensor, the noise combiner, the error calculator, the motion sensing device and the shake estimator, the Kalman filter module configured to determine through coordinate transformation and iteration a solution indicative of a precise indication of a location of the remote emitter that is responsive to the plurality of sequential error values and noise values.

11. The system of claim 10, wherein the at least one sensor comprises at least two sensors physically separated along a measurement baseline.

12. The system of claim 10, wherein the shake estimator comprises a variance module configured to determine for each sequential sensor data sample, and for at least one inertial variable, a respective variance of a respective plurality of angle or angle rate or angle acceleration variations received from the motion sensing device.

13. The system of claim 10, further comprising a noise combiner in communication with the at least one sensor, with the shake estimator and with the Kalman filter module, the noise combiner configured to combine the sensor noise and the sensor motion noise.

14. The system of claim 10, wherein the at least one sensor comprises an antenna configured to electromagnetically detect the remote emitter.

15. A method, executed by a geolocation processor, for determining from a mobile platform having at least two sensors and an motion sensing device, a precise indication of a location of a remote emitter, the method comprising:
    calculating an initial estimate of a location of the remote emitter;
    receiving by the at least two sensors, a respective plurality of sequential sensor difference samples, each sensor difference sample indicative of the time difference of arrival or phase difference of arrival between respective detected emissions from the remote emitter received by the different sensors;
    determining for each of the at least to sensors a respective indication of sensor noise corresponding to each sensor difference sample;
    receiving from the motion sensing device for each sensor difference sample a plurality of sequential mobile platform position and motion data samples over a predetermined time span that includes and precedes the sampling time of said sensor difference sample, including one or more motion parameters;
    calculating position and motion values at the sampling time associated with each sensor difference sample, based on the plurality of sequential mobile platform position and motion data samples;
    determining for each motion value a respective motion noise, based on differences between one or more of the motion parameters and its corresponding plurality of measured values;
    combining for each sensor difference a sample, the respective received indications of sensor noise and sensor motion noise;
    determining an error value for each sensor difference sample, as a difference between the measured sensor difference sample and an estimated sensor value that is calculated from the position and motion values determined at the sampling time for the respective sensor difference samples; and
    determining a Kalman filtered estimate of the precise indication of a location of the remote emitter responsive to the corresponding pluralities of sequential error values and motion noise.

16. The method of claim 1, wherein the predetermined time span over which position and motion data are received is determined such that the motion data for time intervals comprising the predetermined time span becomes less responsive to motions at higher frequencies in the determination of motion values for each time interval, and wherein the time intervals are set at least in part in response to a flexibility of a physical structure connecting the motion sensing device and the at least two sensors.

17. The method of claim 16, wherein the motion sensing device comprises an inertial navigation system, and the motion parameters include at least one parameter selected from pitch, roll, and yaw angles and rates.

18. The method of claim 1, wherein the motion sensing device comprises an inertial navigation system, and the motion parameters include at least one parameter selected from pitch, roll, and yaw angles and rates.

19. The method of claim 1, wherein determining the motion value comprises:
    interpolating along a best-fit line to determine the a motion value corresponding to the time of each sensor data sample; and
    calculating the difference between the plurality of sequential platform motion data samples and their corresponding straight-line fit values, for at least one parameter determining for each motion data sample a motion noise variance as a sum of squared difference values.

20. The method of claim 19, wherein determining the motion noise variance comprises calculating a time-weighted sum that emphasizes values temporally closer to the sampling time of the corresponding motion data sample.

21. The method of claim 1, wherein combining the respective received indications of sensor noise and sensor motion noise comprises a root-sum-square combination.

22. The method of claim 1, further comprising receiving for the at least two sensors a respective indication of an estimate of platform position by sensing differential Doppler phase rates between two signals received by the at least two sensors.

23. The method of claim 1, further comprising receiving for the at least two sensors a respective indication of an estimate of platform position by sensing time difference of arrival (TDOA) between respective signals received by the at least two sensors.

24. The method of claim 1, further comprising refining the remote emitter location estimate using geometric transformations as sensor data observations continue, based on sequential motion data and sensor data, and additional Kalman filter determinations.

25. The system of claim 10, wherein the at least one sensor comprises an antenna configured to electromagnetically detect the remote emitter.

26. The system of claim 10, wherein the at least one sensor comprises an optical detector configured to optically detect the remote emitter.

27. A method for determining from a mobile platform having at least one sensor of radiation from a remote emitter and a motion sensing device, a precise indication of a location of the remote emitter, the method comprising:
    calculating an initial estimate of emitter location, based on assumptions, signal amplitude measurements, information from surveillance, or any other means of establishing at least a crude estimate of location;
    receiving by the at least one radiation sensor, a respective plurality of sequential sensor data input samples, each sensor data input sample indicative of a sequential respective detected emission from the remote emitter;
    determining for the at least one radiation sensor a respective indication of sensor noise corresponding to each sensor data sample;
    receiving from the motion sensing device a plurality of sequential mobile platform position and motion data samples over a predetermined time span that includes and precedes the sampling time of said sensor data samples, including one or more motion parameters;
    determining position and motion values at the sampling time associated with each sensor data sample, based on the plurality of sequential mobile platform position and motion data samples;

determining a best-fit straight line or other function to the plurality of motion values that reduces rapid data fluctuations that are not well conducted by the structure connecting the motion sensor with the sensor, determining for the motion sensor a respective indication of sensor noise corresponding to each motion data sample, determining for each motion value a respective shake noise, based on differences between a one or more of the motion data samples and its corresponding a best-fit straight line or other function;

combining for each of the sensor data samples, the respective received indications of sensor noise, motion sensor noise, and shake motion noise;

determining predicted sensor values at the sampling times of actual sensor data, based on the position and motion values an estimated emitter location;

determining an error value for each sensor data sample, as a difference between the measured sensor data value and the predicted sensor value; and determining a solution from a set of noise and signal values, using a noise-weighted least-error process such as simultaneous equation or Simplex solution, or from noise-weighted statistical processing that selects the most probable location among multiple trial locations using a noise-weighted simultaneous equation or Simplex solution, or by noise-weighted statistical processing that selects the most probable solution among multiple trial locations.

28. The method of claim 27 wherein the motion noise estimate is calculated using frequency response tailoring such as finite impulse response filtering and observation period adjustment, with the intent of improving the estimate of noise due to platform flexure and vibration.

* * * * *